R. H. BROWNLEE & R. H. UHLINGER.
PROCESS FOR THE MANUFACTURE OF HYDROGEN AND CARBON BLACK.
APPLICATION FILED JAN. 21, 1914.
1,276,487.
Patented Aug. 20, 1918.
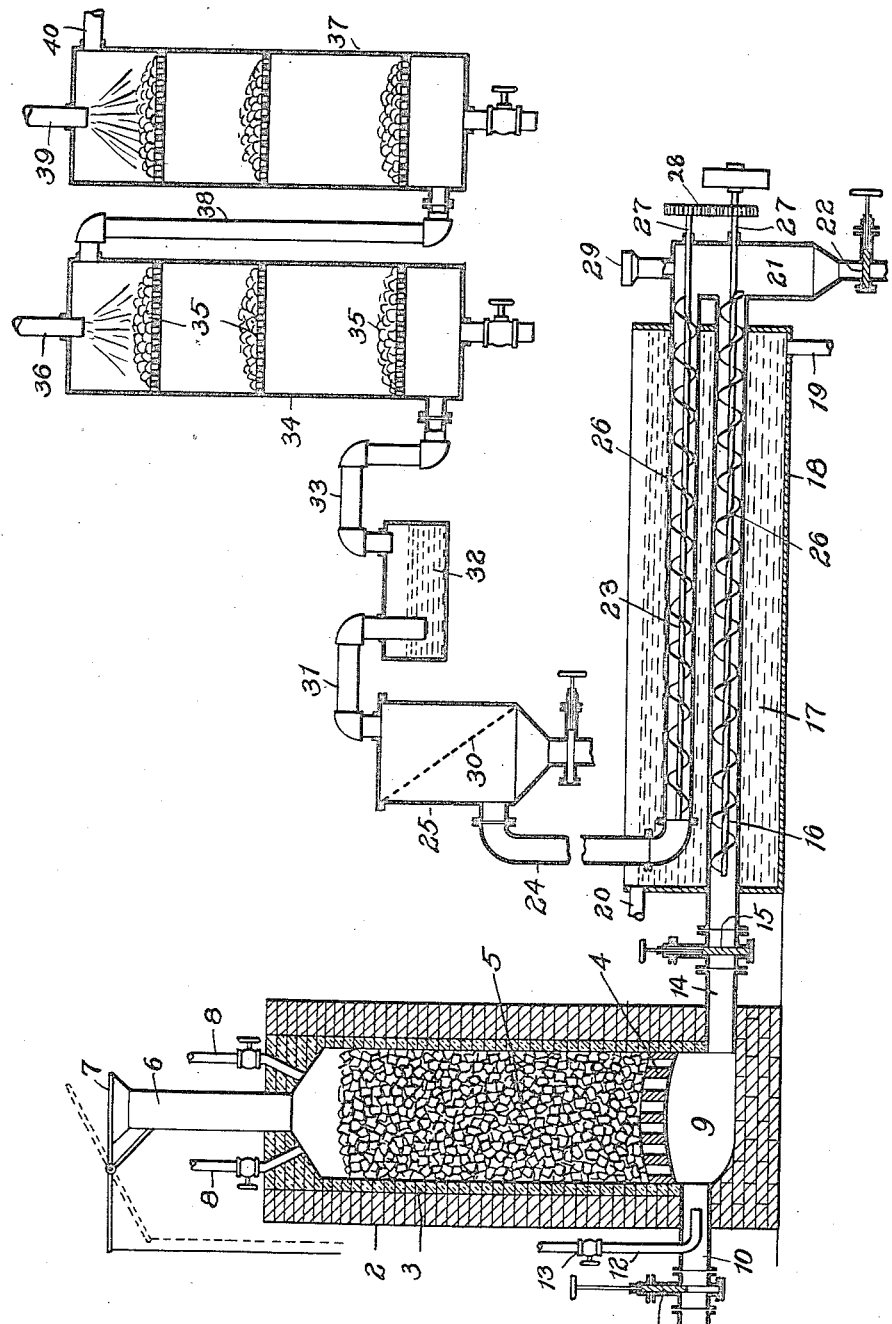
WITNESSES
INVENTORS

UNITED STATES PATENT OFFICE.

ROY H. BROWNLEE AND ROY H. UHLINGER, OF PITTSBURGH, PENNSYLVANIA, ASSIGNORS TO AMERICAN NITRO-PRODUCTS COMPANY, OF PITTSBURGH, PENNSYLVANIA, A CORPORATION OF DELAWARE.

PROCESS FOR THE MANUFACTURE OF HYDROGEN AND CARBON-BLACK.

1,276,487.  Specification of Letters Patent.  Patented Aug. 20, 1918.

Application filed January 21, 1914. Serial No. 813,457.

*To all whom it may concern:*

Be it known that we, ROY H. BROWNLEE and ROY H. UHLINGER, citizens of the United States, residing at Pittsburgh, in the county of Allegheny and State of Pennsylvania, have invented certain new and useful Improvements in Processes for the Manufacture of Hydrogen and Carbon-Black, of which the following is a specification.

Our invention consists of an improved method or process of making hydrogen and carbon black in large quantities at low cost, and without the use of complicated or expensive equipment.

The process most commonly employed for the manufacture of carbon black from natural gas is to effect incomplete combustion of the gas in contact with a collecting exposed surface or surfaces, as a large iron plate or the like. Such a method is very wasteful, producing approximately one pound of carbon black from the possible average amount of thirty-five pounds of carbon theoretically obtainable from one thousand feet of natural gas.

This possible value, which is approximate, varies with the composition of the gas.

In order to increase the yield of carbon and at the same time to produce and collect the resulting hydrogen, attempts have been made and patents have been issued for processes involving the decomposition of the gas by passing it through a highly heated tubular apparatus. Owing, however, to the impossibility of securing a material from which to make the tubes having the necessary attributes of a highly refractory material capable of withstanding the unavoidable strains of expansion and contraction without very heavy walls, good heat conductivity, and at the same time efficient resistance to the decomposing action of carbon and hydrogen at very high temperatures, none of these processes are commercially available, efficient or economical.

Other methods or processes for the making of hydrogen which have been used or tried have utilized the decomposing action of acids upon metals, or the electrolysis of acids or alkalis; the action of strong alkalis upon certain metals, such as aluminum and zinc; the action of steam upon highly heated metals, as iron; the passing of water gas over heated calcium carbid; the passing of water gas and steam over heated lime; the passing of water gas over heated iron; and the liquefaction and rectification of water gas.

While several of these processes are or have been in successful operation, they are, except under specially favorable conditions, complicated and expensive operations, and much more so than our process, while comparatively inefficient as to results.

Generally stated, our process consists in highly heating a mass of highly refractory material within a suitable well insulated containing chamber and then passing through such chamber and hot refractory material a suitable hydrocarbon in the absence of air or other gases, or catalysts, or metals or metallic oxids. By this means the hydrocarbon is decomposed by coming into intimate contact with the highly heated refractory material, and is thereby decomposed, forming hydrogen and carbon.

The drawing shows in section an apparatus adapted to the process.

The process is carried out as follows:

A vertical gas-tight furnace or chamber 2 is constructed, preferably with highly refractive linings 3 of suitable fire brick, and near the bottom is a supporting checker work 4 of similar material. A filling of irregular pieces of refractory material 5 is contained within the body of the furnace, above the supporting checker work 4, or the entire inner part of the furnace may be built up of checker work of suitable refractory brick.

At the top of the furnace is a stack 6 provided with a suitable damper valve 7 for closing the stack and furnace gas-tight. Inlet pipes 8 for supplying the hydrocarbon, as natural gas, are introduced through the upper portion of the furnace. The pressure of gas introduced through these pipes will be normally one pound or more above atmospheric pressure, but owing to the more rapid reaction when a larger mass of gas is present, the pressure in the furnace may be held at two or three atmospheres or higher.

A damper-controlled air conduit 10 having a damper or valve 11, and a gas pipe 12 having a controlling valve 13 are introduced to chamber 9 below the checker work or refractory material 5, for heating the furnace and its contents.

Leading outwardly from the base of furnace 2, at any suitable location, is a conduit 14 provided with an opening and closing valve or damper 15 for controlling the circulation, beyond which the conduit is connected with the tubular conveyer 16.

Said conveyer extends through a cooling bath 17 of water within a surrounding inclosing tank or casing 18, provided with a supply connection 19 and an overflow 20.

The other end of the conveying conduit 16 leads to a receiving hopper 21, provided with an outlet controlling valve 22 at its lower portion for removal of carbon. A return conveying conduit 23, also connected with the hopper 21, provides for return circulation through the water bath 17, above conduit 16, at the other end of which is an upwardly extending conduit 24 opening into a screen box 25.

Each of the conduits 16 and 23 is provided with a rotatable screw conveyer 26, actuated by shafts 27, driven by any suitable gearing 28, whereby to propel the precipitated carbon through the conduits. The upper end of hopper 21 is provided with a relief cap 29, through which excess pressure may escape, if necessary.

Screen box 25 is provided with a fine screen 30 of cloth or other filtering medium of a suitable nature to filter out the carbon remaining in the hydrogen. Beyond the screen is a conduit 31 leading to a water seal vessel 32, in which the terminal of conduit 31 is submerged. A conduit 33 leads from the upper portion of water seal vessel 32 to a scrubber 34 of any suitable construction, provided with porous material 35 and a water spray 36, wherein, by means of water, the gases are cooled and washed. An additional scrubber 37 may also be provided, connected with the primary scrubber 34 by a circulation pipe 38, into which a spray 39 of lime water or other alkaline material may be introduced, by which impurities in the hydrogen are removed, such as traces of sulfur compounds in the gas or other hydrocarbon used, the hydrogen passing off by outlet pipe 40 to any suitable collecting or storage tank.

In case nearly chemically pure hydrogen is required and the available gas or other hydrocarbon, used in the process, contains considerable amounts of nitrogen or other impurities such as carbon monoxid or carbon dioxid, it will be necessary to liquefy and rectify the gases from the furnace to remove these impurities, or other suitable method of purification may be resorted to as required.

Instead of the screen 30 above described, high tension electric currents may be utilized for precipitating the carbon from the hydrogen, if preferred.

The operation of making hydrogen and carbon black, utilizing the above described apparatus, is as follows:

With the valve 7 in stack 6 opened and valve 15 to the carbon precipitating conduit 16 closed, gas (natural gas, coal gas, oil vapor or other hydrocarbon, preferably as a gas, liquid or volatilizable solid) is admitted through pipe 12 with a suitable amount of air by conduit 10 to chamber 9 below the checker work, for the complete combustion of the fuel.

The products of combustion pass upwardly through the interior of furnace 2 and its refractory contents 5, the operation being continued until the furnace and its contents are heated to a very high temperature, i. e., above the temperature at which the hydrocarbons to be used in the formation of hydrogen and carbon black are decomposed.

When a suitable temperature has thus been reached, say, 1400° C., the air supply and then the gas supply is shut off; the stack valve 7 is closed, valve 15 to the carbon precipitator is opened, and air valve 11 is closed. Then the valves in the pipe or pipes 8 at the top of the furnace are opened, and gas or other hydrocarbon is introduced at the top of the furnace.

The hydrocarbon, passing downwardly in contact with the very highly heated refractory surfaces, and in the absence of air, is decomposed to form hydrogen and carbon black. These elements pass outwardly from the base of the furnace through conduit 14, entering the conveying conduit 16, being carried therethrough by lower conveyer 26 through the cooling water bath 17, effecting precipitation of the carbon, which is discharged by the spiral conveyer into hopper 21.

Additional smaller particles of carbon remaining in suspension in the cooled hydrogen are precipitated in the upper return conduit 23, in again passing through the water bath, and are also returned backwardly to hopper 21, by conveyer 26, as will be readily understood. The hydrogen gas passing through the water seal tank 32 and the washing tanks 34 and 37, and finally to the holder is thus completely cleansed of any impurities, and is practically pure.

The operation above described is continued until the temperature in the furnace 2 has been reduced to a degree below which entire decomposition of the hydrocarbon will not occur, whereupon the supply of hydrocarbon gas through pipe 8 is shut off at the top of the furnace. Valve 15 to the precipitator conduit 16 is then closed, stack valve 7 is opened, and gas and air are again admitted from connections 12 and 10 for additional combustion and heating of the refractory contents of the furnace, preparatory to a repetition of the operation just described.

In case a liquid or volatilizable solid is used as a fuel at the base of the furnace, it may be sprayed or blown into the combustion chamber 9 with an air blast. When the same kind of hydrocarbon is used at the top of the furnace, instead of gas, for the making of hydrogen and lamp black, it may also be sprayed in under pressure, or atomized by the aid of compressed hydrogen, without air, so that only minute particles of the hydrocarbon will strike the hot checkerwork.

Otherwise the entire checker work would soon be clogged with carbon, whereas, when either a gas or very fine spray is used, the finely divided carbon is carried down with the gas.

It will be readily understood that some carbon will necessarily adhere to the refractory material and the inner walls of the furnace, but by observing the above precautions this will be reduced to a minimum. Such adhering carbon will be consumed in the next heating operation of the furnace. Owing to incidental traces of moisture in the hydrocarbon used and possible impurities such as metallic oxids in the refractory checkerwork, which are however easily reducible, some carbon monoxid is ordinarily produced during the operation of the furnace.

Where the expression "absence of—catalysts," or "absence of—metals or metallic oxids," is used, it is understood to mean the absence of any supplemental or additional amounts of such, and that any such impurities as remain in the hydrogen are only such small amounts as the hydrocarbon may have have added to it, or from the walls of the furnace, or from the refractory material contained in it.

Where the expression "catalyst" is used, it may be understood to refer to the excluded metals mentioned.

Where suitable natural gas is obtainable, such as Pennsylvania or West Virginia gas, this process is especially suited for making hydrogen, as each 1,000 feet of natural gas will produce on decomposition over 2,100 feet (cubic) of hydrogen.

When one cubic foot of Pennsylvania or West Virginia natural gas burns in air, somewhat over 1,100 B. T. U. (British thermal units) of heat are produced, while only 145 B. T. U. are required to break up the hydrocarbons in a cubic foot of the same gas to form hydrogen and carbon black. This value, 145 B. T. U. also includes the heat necessary to raise the temperature of the gas to the temperature at which it will be decomposed by heat, in addition to the heat of decomposition of the gas.

That is to say that when one cubic foot of the gas burns, over 7.5 times as much heat is produced as is absorbed when one cubic foot of the same gas is decomposed by heat to form hydrogen and carbon black.

In case as large yields of carbon as possible are desired and the hydrogen is not required for other purposes, the operation of heating the furnace may be effected by replacing the usual gas by hydrogen made in a previous run of the furnace for that purpose, and thus no natural gas will be used except for the actual decomposition of the same to form hydrogen and carbon black.

The importance of this procedure will be evident when it is pointed out that the heat of combustion of the hydrogen obtained from 1,000 cubic feet of Pennsylvania or West Virginia natural gas is nearly four and a half times as much as the heat of decomposition of 1,000 cubic feet of the same natural gas.

By thorough insulation of the furnace, and by using regenerators to save the heat that is otherwise wasted in a simple furnace, such as is shown diagrammatically herewith, we may approach more nearly to the theoretical efficiency.

But in practice, owing to the high temperatures of 1,100° C. and over that must be maintained, the heat losses are necessarily very considerable.

It is, of course, desirable to employ a refractory material for the inner lining and filling of the furnace, as with checker work, using a substance that has the highest heat conductivity, and at the same time a high specific heat.

We claim:

1. The process of making carbon black and hydrogen consisting in decomposing a suitable hydrocarbon by bringing it into contact with highly heated refractory material within an inclosing chamber in the absence of air or catalyst, then cooling the decomposed elements to separate the carbon from the hydrogen, then removing and collecting the separated carbon, and then subjecting the hydrogen to cleansing operations to eliminate impurities.

2. The process of making carbon black and hydrogen consisting in heating refractory material within an inclosing chamber by combustion of a suitable fuel therein, then passing a suitable hydrocarbon through the chamber and in contact with the highly heated refractory material in the absence of air or catalyst, then passing the decomposed elements through a water-cooled conduit to effect separation of the carbon from the hydrogen, and then removing and collecting the separated carbon from the circulation of the hydrogen.

3. The process of making carbon black and hydrogen consisting in heating refractory material within an inclosing chamber by combustion of a suitable fuel therein, then passing a suitable hydrocarbon through the chamber and in contact with the highly heated refractory material in the absence of air or catalyst, then cooling the decomposed elements in transit to separate the carbon from the hydrogen effecting mechanical removal of the carbon, and then subjecting the hydrogen to suitable treatment for the elimination of impurities.

4. The process of making carbon black and hydrogen consisting in heating refractory material within an inclosing chamber by combustion of a suitable fuel therein and passing the products of combustion upwardly through such refractory material and outwardly from the top of the chamber, then passing a suitable hydrocarbon downwardly through the upper portion of the chamber and in downwardly traveling contact with the highly heated refractory material in the absence of air or metal or easily reducible metallic oxids, then cooling the decomposed elements in transit to separate the carbon from the hydrogen, removing and collecting the carbon out of the gaseous circulation of the hydrogen, and then subjecting the hydrogen to suitable treatment for the elimination of impurities.

In testimony whereof we hereunto affix our signatures in the presence of two witnesses.

ROY H. BROWNLEE.
ROY H. UHLINGER.

Witnesses:
H. HECK,
C. M. CLARKE.